July 26, 1955   W. B. HOLLAND   2,713,747
ANIMATED WHEELED SOUNDING TOYS
Filed May 10, 1954

INVENTOR.
WILLIAM B. HOLLAND
BY
G. Ward Kemp
ATTORNEY

2,713,747

ANIMATED WHEELED SOUNDING TOYS

William B. Holland, Seattle, Wash.

Application May 10, 1954, Serial No. 428,661

2 Claims. (Cl. 46—98)

This invention relates to mechanical toys, and particularly to animated travelling horses.

In order to amuse children, it is important to provide a toy horse that may be pushed over a floor or pavement, and which will simultaneously simulate natural sounds and movements.

It is therefore an object of this invention to provide an animated toy horse, mounted on two tandem wheels for travel over varying surfaces, and which will toss its head and switch its tail while travelling, and simultaneously provide sounds simulating trotting and galloping hoof beats, together with simulation of flexed legs to indicate rapid travel, while the toy may move slowly.

Figure 1:
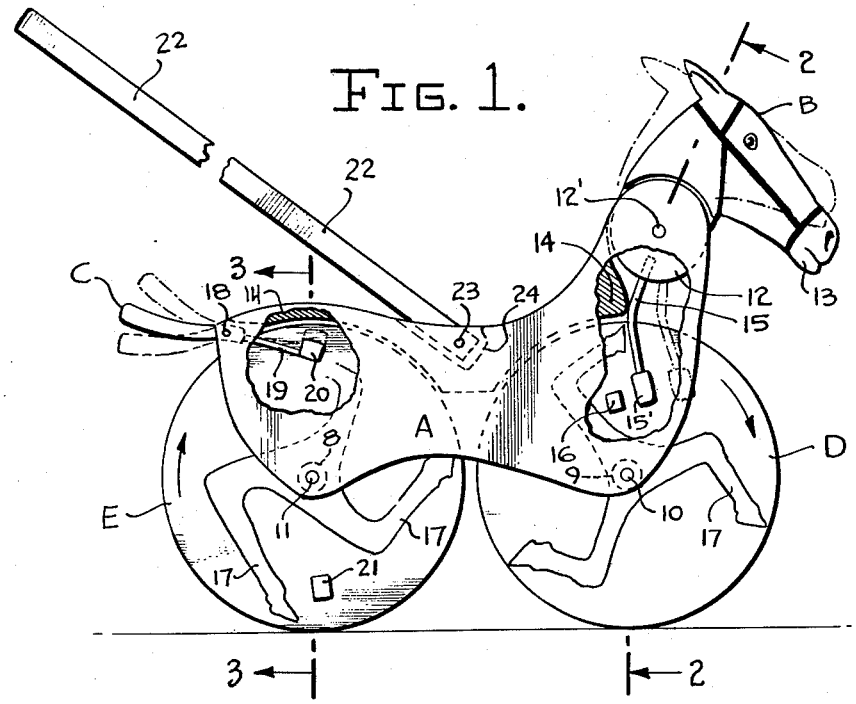
Figure 2:
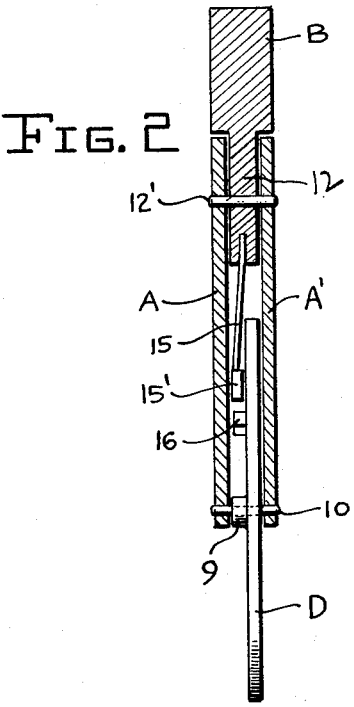
Figure 3:
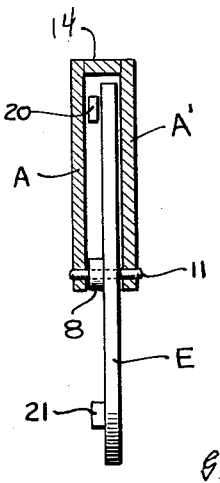

With these and other objects to be hereinafter shown, I have illustratively exemplified my invention by the accompanying drawings of which: Figure 1 is a side elevation of the horse. Figure 2 is a sectional view of the front portion of the horse taken on line 2—2 of Figure 1 and Figure 3 is a sectional view of the rear portion of the horse taken on line 3—3 of Figure 1.

Like characters on the different figures represent like parts.

The letters A and A' represent the two opposite sides of a horse, having a head B and tail C, and mounted on two tandem wheels D and E. The body of the horse is preferably formed from two relatively thin sheets of wood or other suitable material, indicated as A and A', spaced apart by bushings 8 and 9, on axles 10 and 11 for the wheels near the bottom of the body, and spaced at the top by frame 14. Other portions of the operative structure are disposed between the sides, as hereinafter described.

The head has a neck member 12 extended downward and pivotally connected to the sides by pin 12' upon which the head rocks, and normally leans forwardly by weight of the front or jaw portion 13, against a portion of the frame 14. A lever 15 is projected downward from the neck and carries on the lower end thereof a buffer 15' for tossing the head rearwardly. An actuating block 16 is extended laterally from one side of the front wheel in situation thereon for striking the buffer with every revolution of the wheel. When the block so strikes it tosses the head upwardly and simultaneously produces a sound to simulate hoof beats of the horse on a pavement. Then the block pushes the buffer forwardly and upwardly until it is raised above the orbit of the block, and thereupon the block passes beyond the buffer, and the head again bends forwardly into normal position.

In order to simulate rapid travel of the horse, legs 17 are carved or otherwise displayed on the wheels in flexed positions, which also provides illusion of legs of proportionate length for the body, although the radii of the wheels are shorter. While the drawings indicate disc wheels, they may be formed in conventional style with spokes to represent the legs in similar flexed positions.

The tail member is normally cocked upwardly on an angle from the rear end of the body and rockingly supported on pivot 18 through a balancing lever 19. This lever is extended from the root of the tail and forwardly from the pin and carries a counterweight 20 on its front end for balancing the tail at various elevations. A block 21 is extended laterally from the side of the rear wheel in orbital position to strike the weight 20 when the wheel revolves. As the wheel rotates the block pushes the weight upwardly until above the block and simultaneously lowers the tail to substantially horizontal position. The block then passes beyond the weight, and the lever weight swings downward and continues to rock the tail in semblance of natural switching thereof until coming to rest, or until the block again strikes the weight on another revolution of the wheel. When the block 21 strikes the counterweight 20, a clatter is sounded, similar to the hoof beat sounds from the front wheel.

The wheels turn independently from each other, and when the blocks are disposed oppositely, as shown in the drawings, the contacts and sounds will be evenly spaced apart, and resemble the hoof beats of a rapidly trotting horse even if the wheels turn slowly. In order to produce sounds to indicate a galloping horse, the wheels are adjusted to bring the two blocks in positions to strike in closer sequence, alternately for appropriate sounds.

In order to assure that the two wheels may each remain in constant contact with any uneven surface in travel, a push rod or handle 22 is connected by a pivot 23 through a recess 24 along the top of the horse, which will permit the two wheels to automatically follow the surface, of varying elevations, and with varying heights of the operators.

Having described my invention I claim as new for Letters Patent:

1. An animated mechanical toy, comprising, a body for a horse, a pair of tandem ground wheels, rotatively connected to the body adjacent to the bottom of the front and rear ends thereof, said wheels having legs displayed thereon in flexed positions to indicate speedy travel, each of said wheels being provided with a block affixed to one side thereof, a neck rockingly connected to the front end of the body, a head connected to and extended above the neck and normally tilted downwardly therewith, a lever extended downwardly from the neck, a buffer member affixed to the end of the lever and normally positioned within the orbit of the block on the front wheel, said block being extended laterally from the front wheel for striking the buffer for producing sounds simulating hoof beats on a pavement and for tossing the head upwardly, a tail member rockingly extended from the rear end of the body being normally uptilted, a rod pivotally extended forwardly from the root of the tail having a counter weight on the front end thereof within the orbit of the said block on the rear wheel for oscillating the tail switchlike, said block extended laterally from one side of the rear wheel positioned to strike the weight on revolutions of the wheel to rock the tail downwardly and promote oscillation thereof, a handle pivotally connected to the top of the body for pushing the toy forwardly and to assure that both wheels maintain continuous surface contact.

2. An animated mechanical toy, comprising, a body for a horse, a pair of tandem ground wheels, rotatively connected to the body adjacent to the bottom of the front and rear ends thereof, a neck rockingly connected to the forward end of the body, a head connected to and extended above the neck and normally tilted forwardly therewith, a lever projected downwardly from the neck adjacent one side of the front wheel, and having a buffer member affixed on the lower end thereof normally positioned within the orbit of a block on the front wheel, said block being extended laterally from the front wheel for striking the buffer for producing sounds simulating hoof beats on a pavement and for tossing the head upwardly, a handle pivotally connected to the top of the body for pushing the toy forwardly and to assure that both wheels maintain continuous surface contact.

References Cited in the file of this patent

UNITED STATES PATENTS

| | | |
|---|---|---|
| 1,803,197 | Marie | Apr. 28, 1931 |
| 2,382,630 | Gumb | Aug. 14, 1945 |
| 2,400,980 | Dishmaker | May 28, 1946 |
| 2,578,682 | Fernstrom | Dec. 18, 1951 |
| 2,631,406 | Wambach | Mar. 17, 1953 |

FOREIGN PATENTS

| | | |
|---|---|---|
| 490,810 | Great Britain | Aug. 17, 1938 |